(12) United States Patent
Bolz et al.

(10) Patent No.: US 9,245,371 B2
(45) Date of Patent: Jan. 26, 2016

(54) GLOBAL STORES AND ATOMIC OPERATIONS

(75) Inventors: Jeffrey A. Bolz, Santa Clara, CA (US); Patrick R. Brown, Wake Forest, NC (US)

(73) Assignee: NVIDIA Corporation, Santa Clara, CA (US)

( * ) Notice: Subject to any disclaimer, the term of this patent is extended or adjusted under 35 U.S.C. 154(b) by 791 days.

(21) Appl. No.: 12/849,766

(22) Filed: Aug. 3, 2010

(65) Prior Publication Data
US 2011/0063296 A1  Mar. 17, 2011

Related U.S. Application Data

(60) Provisional application No. 61/241,847, filed on Sep. 11, 2009.

(51) Int. Cl.
| | |
|---|---|
| *G06T 15/00* | (2011.01) |
| *G06T 15/80* | (2011.01) |
| *G06T 1/20* | (2006.01) |
| *G09G 5/36* | (2006.01) |
| *G06F 13/16* | (2006.01) |

(52) U.S. Cl.
CPC .................. *G06T 15/005* (2013.01); *G06T 1/20* (2013.01); *G06T 15/80* (2013.01); *G09G 5/363* (2013.01); *G06F 13/1605* (2013.01)

(58) Field of Classification Search
CPC ....... G06T 15/506; G06T 15/50; G06T 15/80; G09G 5/001; G09G 5/004; G06F 13/1605; G06F 12/00; G06F 9/3851; G06F 12/02; G06F 12/126; G06F 3/0659; G06F 9/3834
USPC .......................................................... 345/522
See application file for complete search history.

(56) References Cited

U.S. PATENT DOCUMENTS

| | | | | |
|---|---|---|---|---|
| 5,313,577 | A  * | 5/1994 | Meinerth et al. | 345/568 |
| 6,184,908 | B1 * | 2/2001 | Chan et al. | 345/522 |
| 6,778,178 | B1 * | 8/2004 | Laksono et al. | 345/556 |
| 6,891,543 | B2 * | 5/2005 | Wyatt | 345/541 |
| 7,139,003 | B1 * | 11/2006 | Kirk et al. | 345/531 |
| 2009/0322751 | A1 * | 12/2009 | Oneppo et al. | 345/426 |
| 2010/0110083 | A1 * | 5/2010 | Paltashev et al. | 345/506 |

\* cited by examiner

*Primary Examiner* — Ming Hon
*Assistant Examiner* — Sarah Le
(74) *Attorney, Agent, or Firm* — Artegis Law Group, LLP

(57) ABSTRACT

One embodiment of the present invention sets forth a method for storing processed data within buffer objects stored in buffer object memory from within shader engines executing on a GPU. The method comprises the steps of receiving a stream of one or more shading program commands via a graphics driver, executing, within a shader engine, at least one of the one or more shading program commands to generate processed data, determining from the stream of one or more shading program commands an address associated with a first data object stored within the buffer memory, and storing, from within the shader engine, the processed data in the first data object stored within the buffer memory.

23 Claims, 6 Drawing Sheets

GLOBAL STORES AND ATOMIC OPERATIONS

CROSS-REFERENCE TO RELATED APPLICATIONS

This application claims benefit of U.S. provisional patent application entitled "API Extensions for Advanced Graphics Processing Units", filed on Sep. 11, 2009 and having a Ser. No. 61/241,847.

BACKGROUND OF THE INVENTION

1. Field of the Invention

The present invention relates generally to accessing buffer objects in GPU memory and, more specifically, to global stores and atomic operations.

2. Description of the Related Art

Graphics languages have evolved in a way that allows an application to replace many of the original state machine variables with blocks of user-defined data. For example, the current vertex state has been augmented by vertex buffer objects, fixed-function shading state and parameters have been replaced by shaders/programs and constant buffer objects. Applications switch between coarse sets of state by binding buffer objects to the application context or to other container objects (e.g. vertex array objects) instead of manipulating state variables of the application context.

A typical graphics pipeline includes several shader stages, and each shader stage executes commands specified by the application on data stored in buffer objects bound to the application context. For example, when preparing for a typical graphics pipeline rendering command, an application binds a buffer name associated with a buffer object to the application context, and, in response, a graphics driver looks up the buffer object based on the buffer object name. The application then specifies a set of vertex attributes for the primitives to be rendered, which will be used as inputs to the vertex shader stage, and the graphics driver attaches the buffer object to those vertex attributes. Once the application issues a draw command, the graphics driver locks the buffer object in memory and transmits the draw command and the physical address of the buffer object to the GPU for processing. In such an implementation, the graphics driver tracks the usage of the buffer object and unlocks the buffer object once the buffer object is no longer in use.

One drawback to the current usage of buffer objects is that the graphics driver is responsible for keeping track of buffer objects and determining the physical addresses of buffer objects based on the corresponding buffer names. This results in a graphics driver bottleneck involving pointer chases and L2 cache misses that affects the overall performance of a graphics system. Another drawback to the current usage of buffer objects is that data cannot be written back to the buffer objects from within the different shader stages, thus limiting the flexibility available to programmers when programming subsequent shading stages.

As the foregoing illustrates, what is needed in the art is a mechanism for accessing buffer objects and storing data to buffer objects without causing a graphics driver bottleneck.

SUMMARY OF THE INVENTION

One embodiment of the present invention sets forth a method for accessing data objects stored within a buffer memory. The method comprises the steps of receiving a stream of one or more shading program commands via a graphics driver, executing, within a shader engine, at least one of the one or more shading program commands to generate processed data, determining from the stream of one or more shading program commands an address associated with a first data object stored within the buffer memory, and storing, from within the shader engine, the processed data in the first data object stored within the buffer memory.

Advantageously, using GPU addresses to specify the buffer objects to be written to is a vast improvement over the alternate implementations. Several buffer objects can be accessed within a single draw command and complex data structures can be created in buffer objects that may span multiple allocations. In addition, using GPU addresses also enables a dramatic performance increase in CPU-limited applications.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
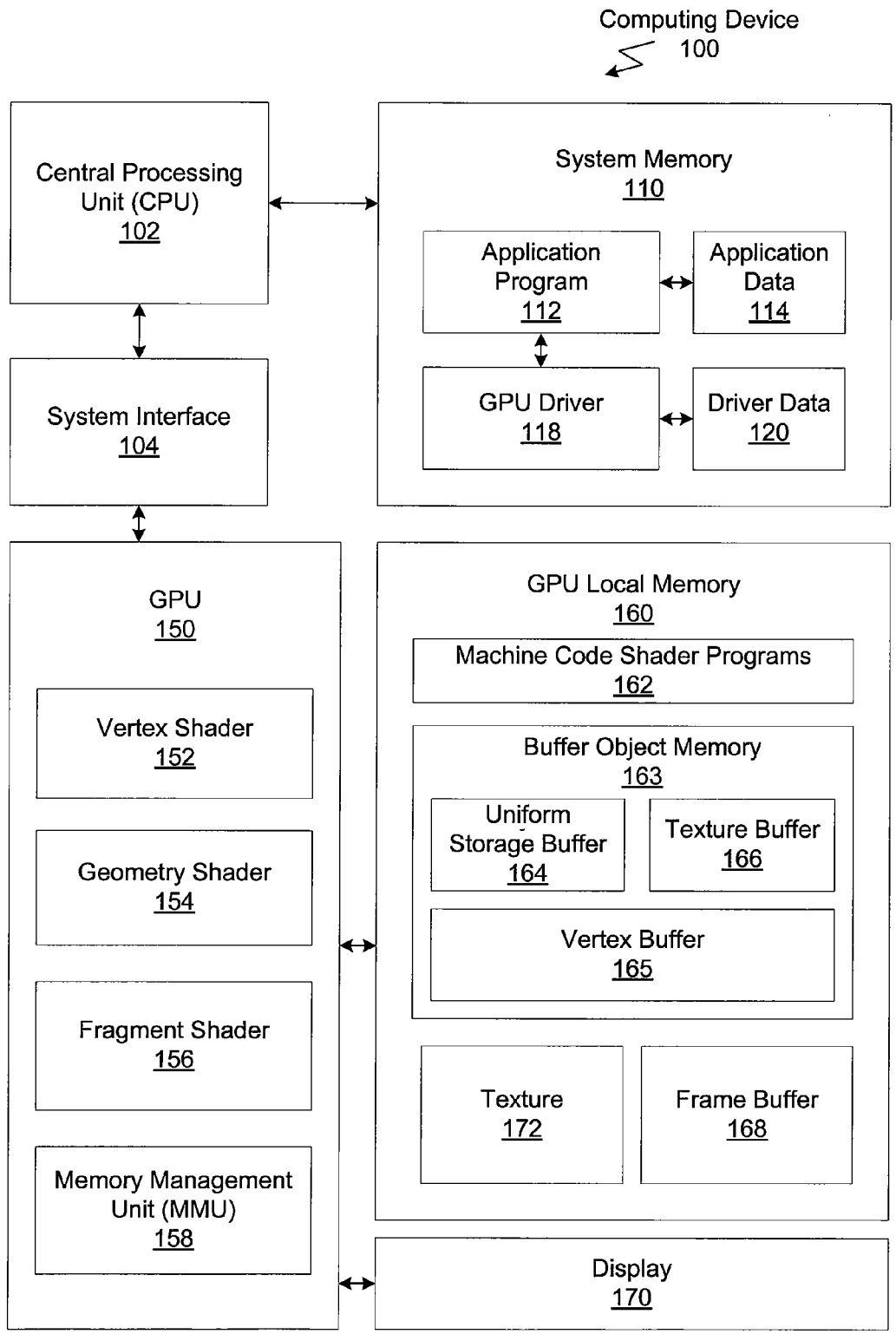
FIG. 1 is a conceptual diagram of a computing device configured to implement one or more aspects of the present invention.

FIG. 1 is a conceptual diagram of a computing device 100 configured to implement one or more aspects of the present invention. The computing device 100 includes a central processing unit (CPU) 102, a system interface 104, a system memory 110, a GPU 150, a GPU local memory 160 and a display 170. The CPU 102 connects to the system memory 110 and the system interface 104. The CPU 102 executes programming instructions stored in the system memory 110, operates on data stored in system memory 110 and communicates with the GPU 150 through the system interface 104, which bridges communication between the CPU 102 and GPU 150. In alternate embodiments, the CPU 102, GPU 150, system interface 104, or any combination thereof, may be integrated into a single processing unit. Further, the functionality of GPU 150 may be included in a chipset of in some other type of special purpose processing unit or co-processor. The system memory 110 stores programming instructions and data for processing by the CPU 102. The system memory 110 typically includes dynamic random access memory (DRAM) configured to either connect directly to the CPU 102 (as shown) or alternately, via the system interface 104. The GPU 150 receives instructions transmitted by the CPU 102 and processes the instructions in order to render graphics data and images stored in the GPU local memory 160. The GPU local memory 160 is any memory space accessible by the GPU 150 including local memory, system memory, on-chip memories, and peer memory. The GPU 150 displays certain graphics images stored in the GPU local memory 160 on the display 170.

The system memory 110 includes an application program 112, application data 114, a GPU driver 118 and GPU driver data 120. The application program 112 generates calls to a graphics API in order to produce a desired set of results, typically in the form of a sequence of graphics images. The application program 112 also transmits one or more shading programs to the graphics API for processing within the GPU driver 118. The high-level shading programs are typically source code text of high-level programming instructions that are designed to operate on one or more shaders within the GPU 150. The graphics API functionality is typically implemented within the GPU driver 118.

The GPU local memory 160 includes a set of machine code shader programs 162, a buffer object memory 163, texture 172 and frame buffer 168. The machine code shader programs 162 are transmitted from the GPU driver 118 to GPU local memory 160. The machine code shader programs 162 may include, without limitation, the machine code vertex shader program, the machine code geometry shader program, the machine code fragment shader program, or any number of variations of each. The buffer object memory 163 includes a uniform storage buffer 164, a texture buffer 166 and a vertex buffer 165. The uniform storage buffer 164 stores one or more uniform variables, also called "uniforms." A uniform variable is held constant during a given invocation of the associated shader but may be altered between invocations. The texture buffer 166 stores data elements typically organized in one-dimensional arrays. The vertex buffer 165 stores data elements describing the position and other attributes of vertices provided as inputs to the vertex shader 152.

The texture 172 and the frame buffer 168 include at least one two-dimensional surface that is used to drive the display 170. The frame buffer 168 may include more than one two-dimensional surfaces so that the GPU 150 can render to one two-dimensional surface while a second two-dimensional surface is used to drive the display 170. Data stored within the texture 172 and the frame buffer 168 is typically accessed with the assistance of application specific hardware that provides for a dimensional access view of the data. For example a two-dimensional surface may be addressed with the assistance of a hardware unit that transposes a horizontal and vertical surface location into a physical memory address that corresponds to the location.

The GPU 150 includes a vertex shader 152, a geometry shader 154 and a fragment shader 156 and a memory management unit (MMU) 158. As is well-known, the vertex shader 152 receives a sequence of one or more sets of vertex attributes, where each set of vertex attributes is typically associated with one vertex and one or more vertices are associated with a geometric primitive. The vertex shader 152 processes the vertex attributes, performing such operations as evaluating the vertex's position relative to the viewer and evaluating lighting equations to determine each vertex color. The vertex shader 152 may also use data from the buffer object memory 163 in the GPU local memory 160. For example, the vertex shader 152 may use data from the uniform storage buffer 164 or the texture buffer 166. The machine code vertex shader program executes on the vertex shader 152, imparting specific processing behavior according to specific requirements and specifications of the application program 112. The geometry shader 154 receives sets of processed vertices from the vertex shader 152. The geometry shader 154 performs per-primitive operations on vertices grouped into primitives such as triangles, lines, strips and points emitted by the vertex shader 152, enabling functionality such as shadow volume generation and procedural synthesis. The machine code geometry shader program executes on the geometry shader 154, imparting specific processing behavior according to specific requirements and specifications of the application program 112. A fixed-function rasterizer (not shown) that is situated between the geometry shader 154 and the fragment shader 156 scan converts an individual geometric primitive into a set of fragments with interpolated vertex attributes. The fragment shader 156 processes the fragments, each containing fragment data, which may include raster position, depth or interpolated vertex attributes, such as texture coordinates, opacity, and other relevant per-pixel data, to produce final pixel values. The final pixel values are stored in the frame buffer 168 by a fixed-function raster operations unit (not shown) that also performs operations such as depth and stencil tests as well as any blending of the final pixel values with values currently stored in the frame buffer. The machine code fragment shader program executes on the fragment shader 156, resulting in specific processing behavior according to specific requirements and specifications of the application program 112.

In other embodiments, the GPU 150 may include additional shaders such as the tessellation control shader (not shown) and a tessellation evaluation shader (also not shown). All such embodiments of the GPU 150 are within the scope of the current invention.

The MMU 158 is configured to map virtual addresses into physical addresses. The MMU 158 includes a set of page table entries (PTEs) used to map a virtual address to a physical address of a page, and optionally includes a cache. The MMU 158 may include address translation lookaside buffers (TLB) or caches which may reside within the GPU 150. The physical address is processed to distribute surface data access locality to allow efficient request interleaving among partition units. The cache may be used to determine whether or not a request for a cache line is a hit or miss, improving the performance of the MMU.

The display 170 is an output device capable of emitting a visual image corresponding to an input data signal. For example, the display may be built using a cathode ray tube (CRT) monitor, a liquid crystal display, or any other suitable display system. The input data signal to the display 170 is typically generated by scanning out the contents of one or more frames of image data that is stored in the frame buffer 168.

Figure 2:
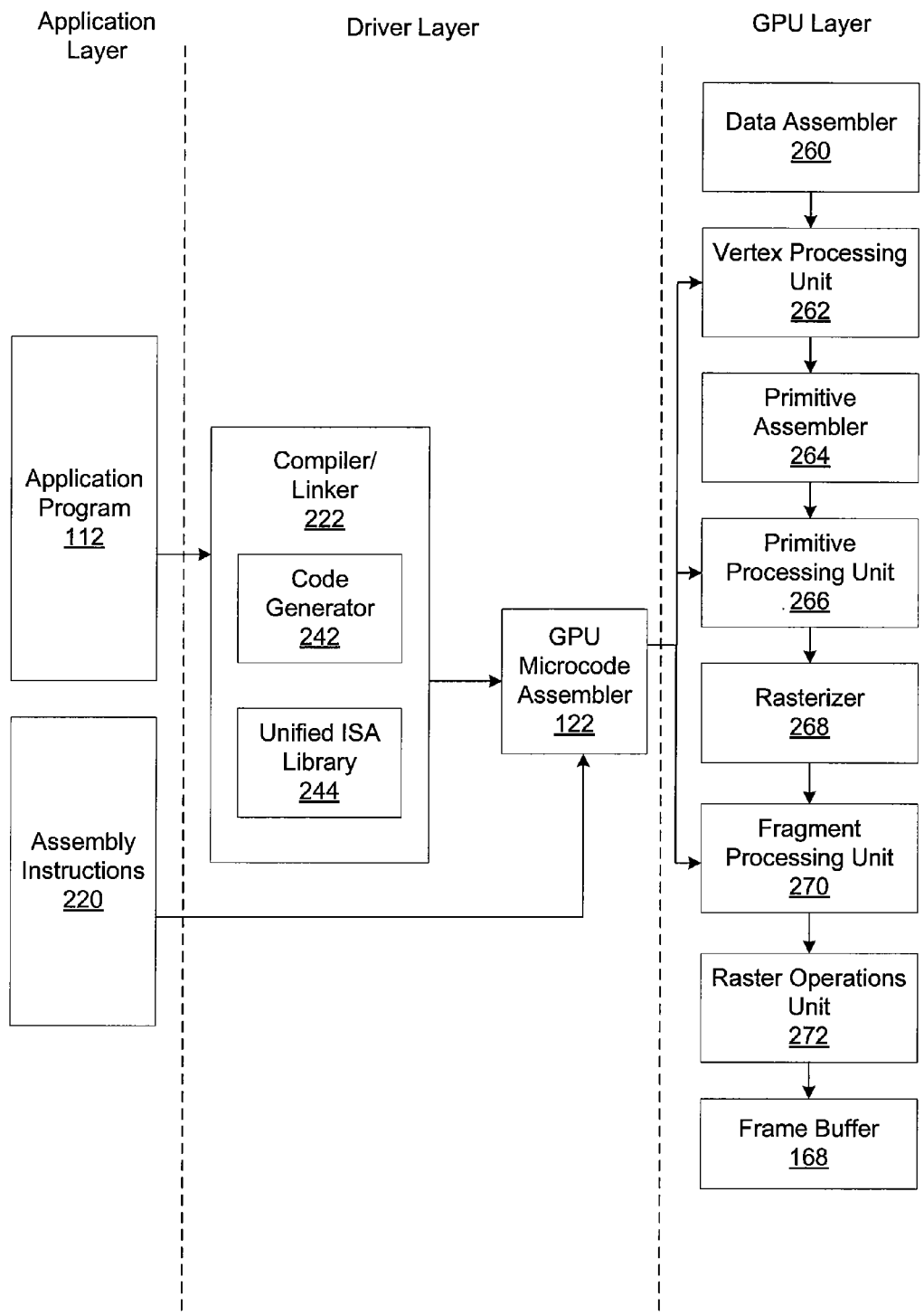
FIG. 2 is a conceptual diagram of a shader programming model, according to one embodiment of the present invention.

FIG. 2 is a conceptual diagram of a shader programming model 200, according to one embodiment of the present invention. As shown, the shader programming model 200 includes the application program 112, which transmits high-level shader programs to the GPU driver 118. The GPU driver 118 then generates machine code programs that are used within the GPU 150 to specify shader behavior within the different processing domains of the GPU 150.

The high-level shader programs transmitted by the application program 112 may include a high-level vertex shader program, a high-level geometry shader program and a high-level fragment shader program. Each of the high-level shader programs is transmitted through an API to the compiler/linker 222 within the GPU driver 118. The compiler/linker 222 compiles the high-level shader programs 114 into assembly language program objects.

Under shader programming model 200, domain-specific shader programs, such as high-level vertex shader program, high-level geometry shader program, and high-level fragment shader program, are compiled using a common instruction set target, supported by unified instruction set architecture (ISA) library 244. With the common instruction set, application developers can compile high-level shader programs in different domains using a core set of instructions having the same syntax and consequently should expect faster compile times for such shader programs. One example of this common ISA is supported by the Unified Instruction Set Architecture ("ISA") developed by NVIDIA Corporation, Santa Clara, U.S.A.

Compiler/linker 222, which includes code generator 242 and unified ISA library 244, provides cross-domain linking capabilities. Specifically, compiler/linker 222 translates the high-level shader programs designated for different domains (e.g., the high-level vertex shader program, the high-level geometry shader program, and the high-level fragment shader program), which are written in high-level shading language, into distinct compiled software objects in the form of assembly code. Further, instead of sending these compiled objects of assembly code individually to separate GPU microcode assemblers (not shown), compiler/linker 222 also "links" the compiled assembly code to generate a single compiled/linked program object, also in the form of either assembly code or machine code. To link multiple compiled objects from different domains (also referred to as to "rendezvous"), compiler/linker 222 needs to reconcile the use of symbols across the domains. Specifically, there are generally two types of symbols, the first type being defined or exported symbols, and the second type being undefined or imported symbols. The first type of symbols broadly refers to functions or variables that are present in one compiled object (e.g., vertex shader assembly code) and should be made available for use by other compiled objects (e.g., geometry shader assembly code and/or fragment shader assembly code). The second type of symbols broadly refers to functions or variables that are called or referenced by one compiled object (e.g., vertex shader assembly code) but are not internally defined within this compiled object.

The program objects are transmitted to the GPU microcode assembler 122, which generates machine code programs, including a machine code vertex shader program, a machine code geometry shader program and a machine code fragment shader program. The machine code vertex shader program is transmitted to a vertex processing unit 262 for execution. Similarly, the machine code geometry shader program is transmitted to a primitive processing unit 266 for execution and the machine code fragment shader program is transmitted to a fragment processing unit 270 for execution.

Shader programs can also be transmitted by the application program 112 via assembly instructions 220. The assembly instructions 220 are transmitted directly to the GPU microcode assembler 122 which then generates machine code programs, including a machine code vertex shader program, a machine code geometry shader program and a machine code fragment shader program, as previously described herein.

A data assembler 260 and the vertex processing unit 262 function as the vertex shader 152 of FIG. 1. The data assembler 260 is a fixed-function unit that collects vertex data for high-order surfaces, primitives, and the like, and outputs the vertex data to vertex processing unit 262. The data assembler 260 may gather data from buffers stored within system memory 110 and GPU local memory 160 as well as from API calls from the application program 112 used to specify vertex attributes. The vertex processing unit 262 is a programmable execution unit that is configured to execute a machine code vertex shader program, transforming vertex data as specified by the vertex shader programs. For example, vertex processing unit 262 may be programmed to transform the vertex data from an object-based coordinate representation (object space) to an alternatively based coordinate system such as world space or normalized device coordinates (NDC) space. The vertex processing unit 262 may read vertex attribute data directly from the GPU local memory 160 via the buffer load mechanism described below. The vertex processing unit 262 may read texture map data as well as uniform data that is stored in GPU local memory 160 through an interface (not shown) for use in processing the vertex data. The vertex shader 152 represents the vertex processing domain of the GPU 150.

A primitive assembler 264 and the primitive processing unit 266 function as the geometry shader 154. A second primitive assembler (not shown) may be included subsequent to the primitive processing unit 266 in the data flow through the GPU 150. The primitive assembler 264 is fixed-function unit that receives processed vertex data from vertex processing unit 262 and constructs graphics primitives, e.g., points, lines, triangles, or the like, for processing by primitive processing unit 266. In prior art systems, the primitive processing unit performs well-known, fixed-function viewport operations such as clipping, projection and related transformations on the incoming vertex data. In the GPU 150, the primitive processing unit 266 is a programmable execution unit that is configured to execute machine code geometry shader program to process graphics primitives received from the primitive assembler 264 as specified by the geometry shader program. For example, in addition to well-known viewport operations, the primitive processing unit 266 may be programmed to subdivide the graphics primitives into one or more new graphics primitives and calculate parameters, such as plane equation coefficients, that are used to rasterize the new graphics primitives. The primitive processing unit 266 may read data directly from the GPU local memory 160 via the buffer load mechanism described below. Additionally, the primitive processing unit 266 may read texture map data that is stored in GPU local memory 160 through an interface (not shown) for use in processing the geometry data. The geometry shader 154 represents the geometry processing domain of the GPU 150. The primitive processing unit 266 outputs the parameters and new graphics primitives to a rasterizer 268. The rasterizer 268 is a fixed-function unit that scan converts the new graphics primitives and outputs fragments and coverage data to the fragment processing unit 270.

The fragment processing unit 270 performs the functions of the fragment shader 156 of FIG. 1. The fragment processing unit 270 is a programmable execution unit that is configured to execute machine code fragment shader programs to transform fragments received from rasterizer 268 as specified by the machine code fragment shader program 128. For example, the fragment processing unit 270 may be programmed to perform operations such as perspective correction, texture mapping, shading, blending, and the like, to produce shaded fragments that are output to a raster operations unit 272. The primitive processing unit 266 may read data directly from the GPU local memory 160 via the buffer load mechanism described below. Additionally, the fragment processing unit 270 may read texture map data as well as uniform data that is stored in local memory 160 through an interface (not shown) for use in processing the fragment data. The raster operations unit 272 optionally performs fixed-function computations such as near and far plane clipping and raster operations, such as stencil, z test and the like, and outputs pixel data as processed graphics data for storage in a buffer in the GPU local memory 160, such as the frame buffer 168.

Figure 3:
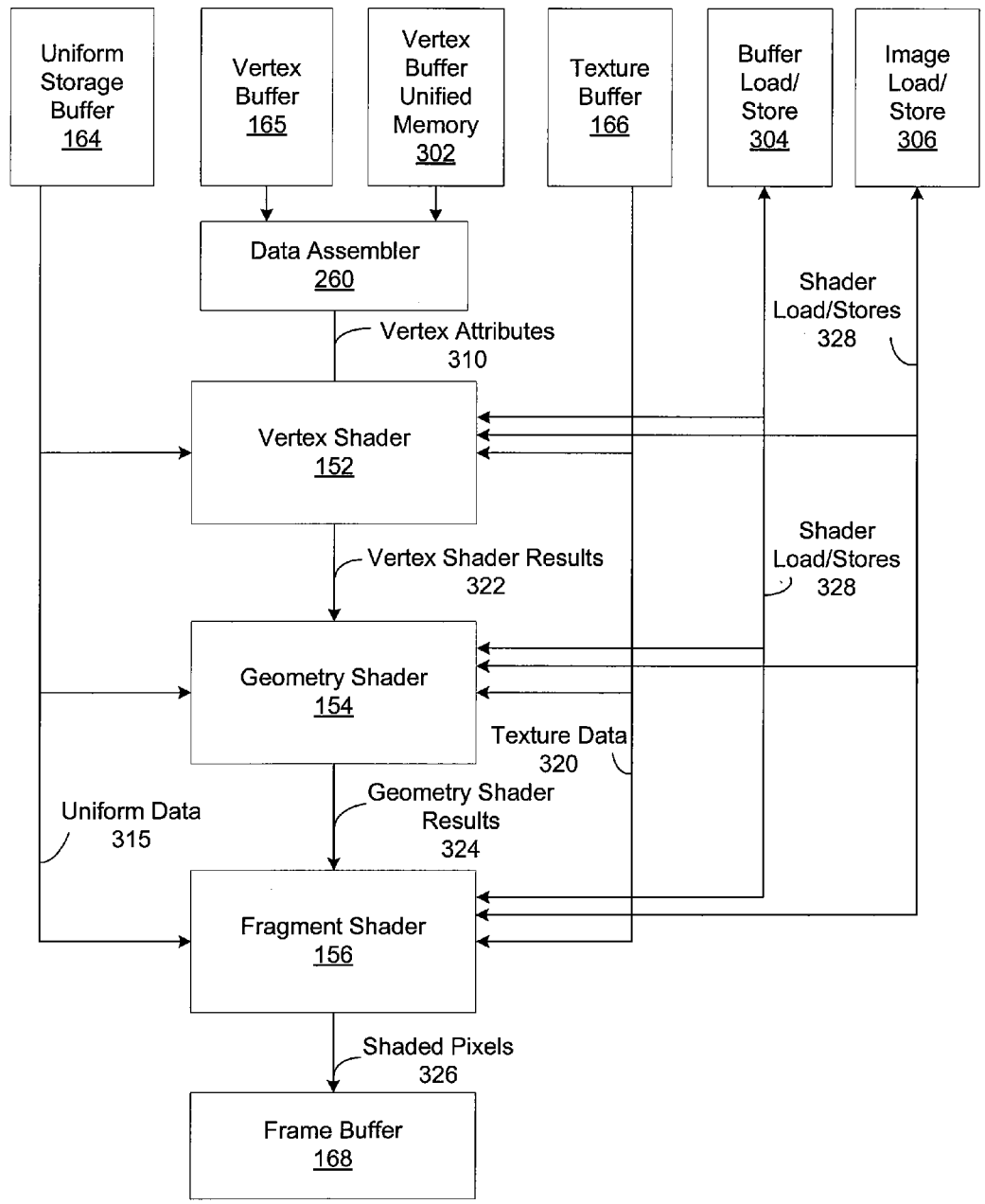
FIG. 3 is a data flow diagram of a programmable graphics pipeline residing within the GPU of FIG. 1, according to one embodiment of the present invention.

FIG. 3 is a data flow diagram of a programmable graphics pipeline residing within the GPU of FIG. 1, according to one embodiment of the present invention. The vertex shader 152, the geometry shader 154 and the fragment shader 156 of FIG. 1 are configured according to the shader programming model 200 of FIG. 2.

The vertex shader 152 executes the machine code vertex shader program in order to process a stream of vertex attributes 310 received from the vertex buffer 165 or a vertex buffer unified memory 302 via the data assembler 260. The vertex attributes 310 received from the vertex buffer unified memory 302 are attached to a vertex state set in an application context of the application program 112. The vertex shader 152 may access data from additional sources, such as uniform data 315 from the uniform storage buffer 164 and texture data 320 from the texture buffer 166. The vertex shader results 322 are transmitted to the geometry shader 154, which processes the vertex shader results 322 according to the machine code geometry shader program. The geometry shader 154 may access data from additional sources, such as uniform data 315 from the uniform storage buffer 164 and texture data 320 from the texture buffer 166. The geometry shader results 324 are transmitted to the fragment shader 156. The fragment shader 156 executes the machine code fragment shader program in order to process the geometry shader results 324. The fragment shader 156 may access data from additional sources, such as uniform data 315 from the uniform storage buffer 164 and texture data 320 from the texture buffer 166. The output of the fragment shader 156 includes a stream of shaded pixels 326 that are written to the frame buffer 168.

In addition, each of the vertex shader 152, the geometry shader 154 and the fragment shader 156 may retrieve data from and write data to buffer objects stored within the buffer object memory 163 via the buffer load/store mechanism 304. Similarly, each of the vertex shader 152, the geometry shader 154 and the fragment shader 156 may retrieve texture data and write texture data to image units stored within texture 172 via the image load/store mechanism 306.

Writing to Buffer Objects Via GPU Addresses

The present invention is a mechanism for accessing buffer objects within the buffer object memory 163 via a GPU address assigned to those buffer objects. The discussion below describes how buffer objects are created within the buffer object memory 163 and how data can be written to a buffer object from any of the shader engines of the GPU 150 via the buffer load/store mechanism 304.

Figure 4:
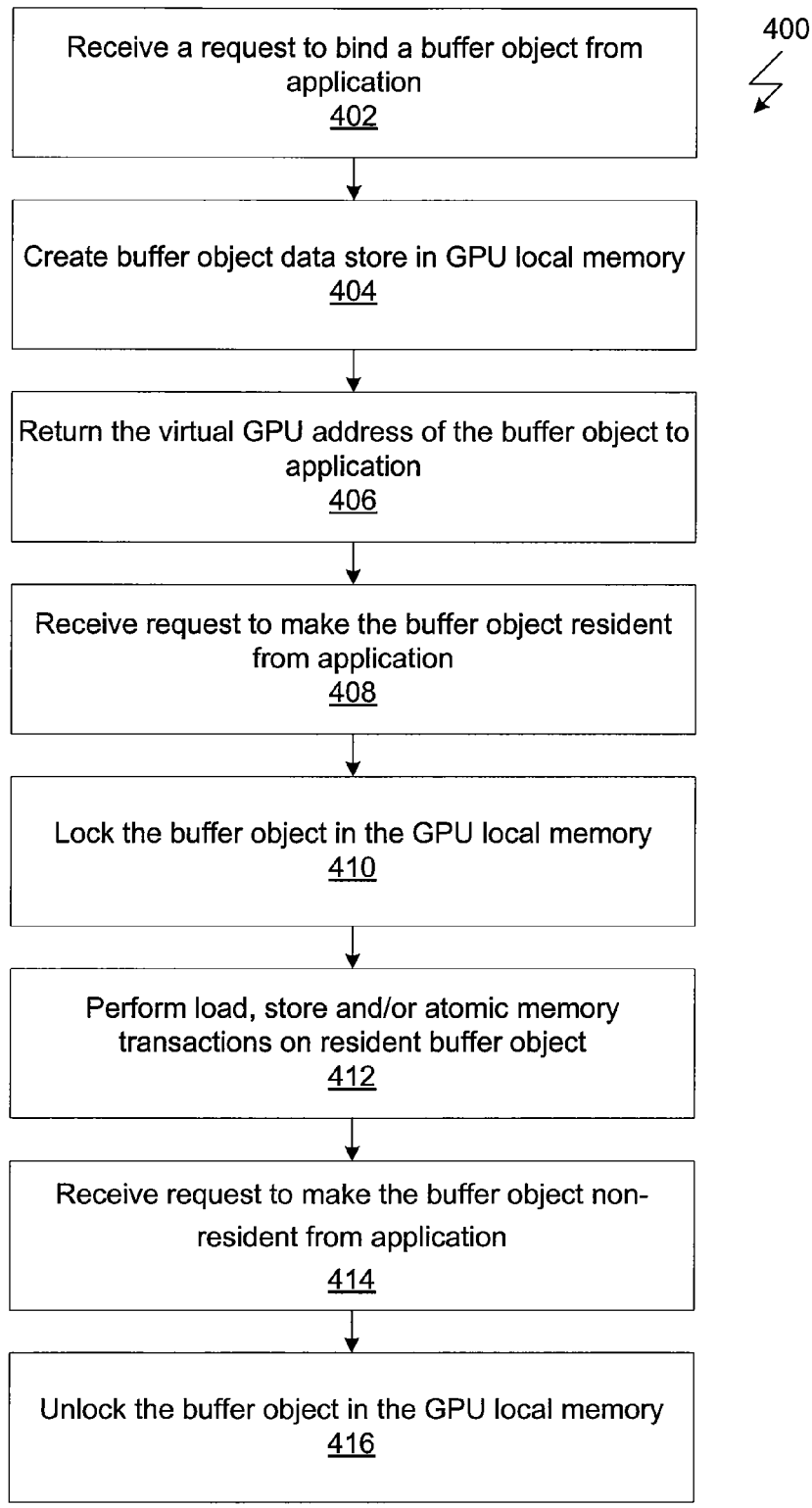
FIG. 4 is a flow diagram of method steps for making a buffer object resident in the buffer object memory, according to one embodiment of the present invention.

FIG. 4 is a flow diagram of method steps for making a buffer object resident in the buffer object memory, according to one embodiment of the present invention. Although the method steps are described in conjunction with the systems for FIGS. 1-3, persons skilled in the art will understand that any system configured to perform the method steps, in any order, is within the scope of the invention.

The method 400 begins at step 402, where the GPU driver 118 receives a request from the application program 112 to bind a buffer object within the buffer object memory 163 of the GPU local memory 160 to a buffer object identifier. At step 404, the GPU driver 118 creates the buffer object based on the request received from the application program 112. At step 406, based on a request received from the application program 112, the GPU driver 118 returns the GPU address of the of the buffer object created in the specific buffer. The GPU address remains valid for the lifetime of the buffer object. At step 408, the GPU driver 118 receives a request from the application program 112 to make the buffer object resident such that it is guaranteed to be accessible to the GPU 150. In response, at step 410, the GPU driver 118 locks the buffer object in the buffer object memory 163.

At step 412, a shader engine in the GPU 150, such as the vertex shader 152, performs one or more memory transactions on the resident buffer object. A memory transaction can be a load/store operation or an atomic operation.

At step 414, the GPU driver 118 receives a request from the application program 112 to make the buffer object non-resident. In response, at step 416, the GPU driver 118 unlocks the buffer object in the buffer object memory 163. When the buffer object is made non-resident, the buffer object can no longer be accessed by a shader engine in the GPU 150.

In one embodiment, the GPU driver 118 locks buffer objects by binding the buffer objects to the context of the application program 112 and storing a list of all the currently bound buffer objects. A second list of all buffer objects that have been locked since the last command buffer submission, including those that were locked at the time of the last submission, is also maintained. When a user-mode driver fills out the command buffer with the commands received from the application program 112, the allocation list of the command buffer is populated with each buffer object in this second list of buffer objects stored in the GPU driver 118. Importantly, a GPU address associated with a buffer object is valid in all contexts to which the buffer object belongs. An alternate embodiment would only store a list of currently bound buffer objects, and their memory would always be accessible to the GPU.

In an alternate embodiment of the present invention, the GPU address associated with a buffer object is also a CPU address within a CPU address space.

In another alternate embodiment, the GPU address is a 64-bit unsigned integer. In yet another alternate embodiment, the GPU address is a high-level language pointer that points to the corresponding buffer object in the buffer object memory 163. In yet another alternate embodiment, the GPU address is a virtual GPU address and is translated to a physical memory address at run-time.

In operation, as previously described, command streams transmitted by the GPU driver 118 are processed within the GPU 150 and specify shader behavior of the different processing domains of the GPU 150. A command stream may include commands for performing vertex operations within the vertex shader 152, primitive operations within the geometry shader 154 or fragment operations within the fragment shader 156.

A command stream may also include a store command that specifies a GPU address associated with a buffer object within the buffer object memory 163. The store command also specifies the data that should be stored within the buffer object associated with the GPU address. When a store command is executed within the vertex shader 152, the geometry shader 154 or the fragment shader 156, the data specified by the store command is stored within the buffer object associated with the GPU address.

A command stream may also include an atomic command that specifies one or more GPU addresses, each GPU address associated with a different buffer object within the buffer object memory 163. In addition, the atomic command also specifies a numerical operation to be performed on data stored within the buffer object specified by the atomic command. When an atomic command is executed within the vertex shader 152, the geometry shader 154 or the fragment shader 156, data are read from the buffer object associated with the GPU address, the specified numerical operation is performed, and the result of the numerical operation is stored in within to the same location in buffer object memory 163. The set of atomic commands supported for buffer object memory include, but are not limited to:

- 32-bit float, integer, and unsigned integer, and 64-bit unsigned integer atomic addition
- 32-bit integer and unsigned integer atomic minimum
- 32-bit integer and unsigned integer atomic maximum
- 32-bit unsigned integer atomic increment with wrapping
- 32-bit unsigned integer atomic decrement with wrapping
- 32-bit integer and unsigned integer atomic bitwise AND
- 32-bit integer and unsigned integer atomic bitwise OR
- 32-bit integer and unsigned integer atomic bitwise XOR
- 32-bit integer and unsigned integer, and 64-bit unsigned integer atomic exchange
- 32-bit integer and unsigned integer, and 64-bit unsigned integer atomic compare and swap At the time an atomic command is executed, multiple independent vertex shader 152, geometry shader 154, and fragment shader 156 invocations may be executing concurrently, each of which may be capable of accessing the buffer object memory 163 corresponding to the GPU address specified in the atomic command. When the atomic command is executed, any other memory transactions involving the buffer object memory are deferred until the command is completed. This mechanism prevents memory corruption if multiple shader invocations are simultaneously reading and writing the same buffer object memory 163.

When an atomic command is executed, the value read from the buffer object memory 163 prior to the numerical operation is returned to the vertex shader 152, geometry shader 154, or fragment shader 156, allowing the shader to perform further operations based on the value returned.

Atomic operations are useful for synchronizing between threads (e.g. to implement critical sections), to reserve space in a common buffer (e.g. a shared incrementing counter), or to collect results from multiple threads running in parallel (e.g. histogramming, identifying minimum/maximum values, etc.) and having those atomic operations act on a global memory address avoids wasting resources.

Figure 5A:
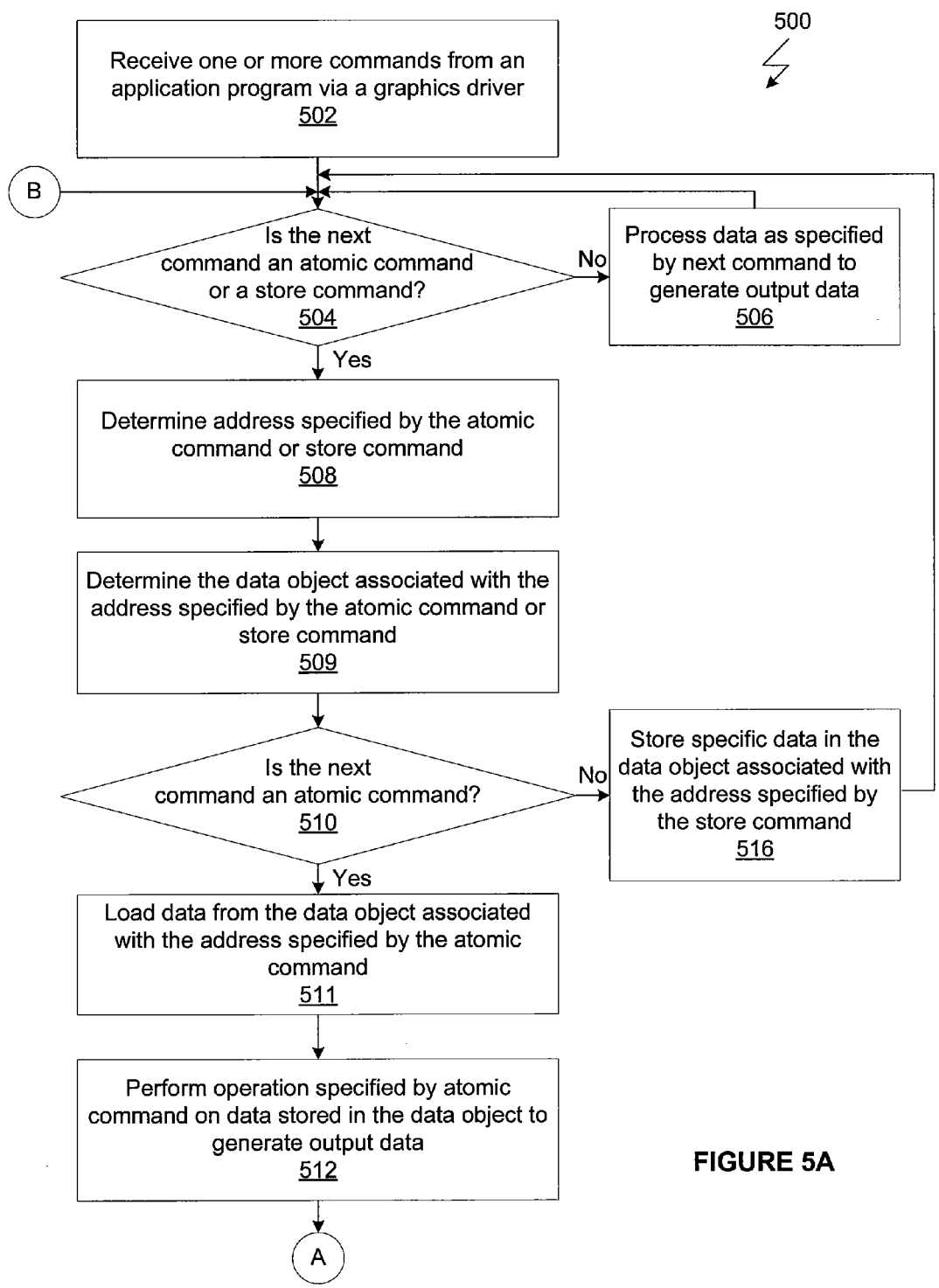
FIGS. 5A and 5B set forth a flow diagram of method steps for storing data in a buffer object from within a shader program executing on the GPU.
Figure 5B:
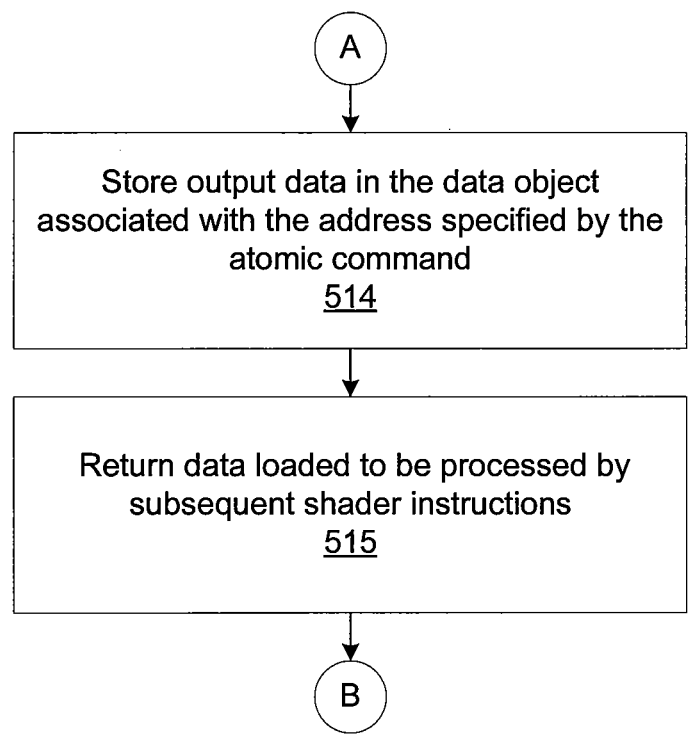

FIGS. 5A and 5B set forth a flow diagram of method steps for storing data in a buffer object from within a shader program executing on the GPU. Although the method steps are described in conjunction with the systems for FIGS. 1-3, persons skilled in the art will understand that any system configured to perform the method steps, in any order, is within the scope of the invention.

The method 500 begins at step 502, where a shader engine within the GPU 150 receives one or more commands from the application program 112 via the graphics driver 118. The shader engine could be any of the vertex shader 152, geometry shader 154 or the fragment shader 154. One or more commands received by the vertex shader 152 may include commands for processing vertex attributes to generate processed vertex information. The processed vertex information can be used by subsequent commands processed in the vertex shader 152 or commands processed in subsequent shader engines, such as the geometry shader 154 or the fragment shader 154. One or more commands received by the geometry shader 154 may include commands for processing vertex attributes to generate primitive information. The primitive information can be used by subsequent commands processed in the geometry shader 154 or commands processed in subsequent shader engines, such as the fragment shader 156. Similarly, one or more commands received by the fragment shader 156 may include commands for processing primitive information to generate fragment information. The fragment information can be used by subsequent commands processed in the fragment shader 154 or commands processed in subsequent processing engines (not shown) within the GPU 150. The fragment information may also be stored within the frame buffer 168.

At step 502, the shader engine within the GPU 150 determines whether the next command is an atomic command or a store command. If the next command is not an atomic command or a store command, then, at step 506, the shader engine processes data as specified by the next command to generate output data. In one embodiment, the data specified by the next command is stored in a buffer object within the buffer object memory 163 and is retrieved using a load command that specifies a GPU address associated with the buffer object. The method 500 returns to step 504 where the next command is analyzed.

If, however, at step 504, the next command is an atomic command or a store command, then, at step 508, the shader engine within the GPU 150 determines the GPU address specified by the atomic command or the store command. At step 509, the GPU 150 identifies the data object resident within the buffer object memory 163 associated with the GPU address specified by the atomic command or the store command.

At step 510, the shader engine within the GPU 150 determines whether the next command is an atomic. If the next command is not an atomic command (and, therefore, is a store command), then, at step 516, data indicated by the store command is stored within the buffer object associated with the GPU address specified by the store command via the buffer load/store mechanism 304. In one embodiment, the data is output data that was generated when a previous command was executed.

If the next command is an atomic command, then, at step 511, the shader engine within the GPU 150 loads data from the data object associated with the address specified by the atomic command. At step 512, the shader engine within the GPU 150 performs the operation specified by the atomic command on data stored in the data object associated with the GPU address specified by the atomic command. The result of the operation is output data. At step 514, the shader engine within the GPU 150 stores the output data generated by performing the operation in a buffer object associated with a GPU address specified by the atomic command via the buffer load/store mechanism 304. At step 515, the shader engine within the GPU 150 returns the data loaded from the data object at step 511 to be processed by subsequent shader instructions.

Advantageously, using GPU addresses to specify the buffer objects to be written to is a vast improvement over the alternate implementations. Several buffer objects can be accessed within a single draw command and complex data structures can be created in buffer objects that may span multiple allocations. In addition, using GPU addresses also enables a dramatic performance increase in CPU-limited applications.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Another embodiment of the invention may be implemented as a program product deployed for use over a network. In such an embodiment, the program product may be accessed via a web browser.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A computer-implemented method for accessing data objects stored within a buffer memory, the method comprising:
   receiving a stream of one or more shading program commands via a graphics driver that executes within a central processing unit;
   executing, within a shader engine, at least one of the one or more shading program commands to generate processed data;
   determining from the stream of one or more shading program commands an address generated by the graphics driver and included in the at least one of the one or more shading program commands, wherein the address is associated with a first data object stored within the buffer memory; and
   storing, from within the shader engine, the processed data in the first data object stored within the buffer memory,
   wherein the first data object has been bound to a context of an application program by the graphics driver to provide the shader engine with access to the first data object, and the application program is associated with the stream of one or more shading program commands.

2. The method of claim 1, wherein the address associated with the first data object is specified as a high-level language pointer.

3. The method of claim 2, wherein the step of storing the processed data comprises dereferencing the high-level language pointer to access the first data object.

4. The method of claim 1, wherein the stream of one or more commands includes a first command for processing vertex attributes to generate the processed data.

5. The method of claim 1, wherein the stream of one or more commands includes a first command for processing vertex information stored in a second data object within the buffer memory to generate the processed data.

6. The method of claim 1, wherein the stream of one or more commands includes a first command for processing primitive information stored in a second data object within the buffer memory to generate the processed data.

7. The method of claim 1, wherein a first command comprises an atomic memory transaction command that specifies an operation to be performed on data currently stored in the first data object to generate the processed data.

8. The method of claim 7, wherein data previously stored in the first data object is read, a computation involving a value and an operation specified in the atomic memory transaction is performed, and the result is stored in the first data object.

9. The method of claim 8, wherein no other memory transactions involving the data stored in the first data object are permitted for the duration of the atomic memory transaction.

10. The method of claim 8, where the value previously stored in the first data object is returned to the shading engine for further processing.

11. The method of claim 1, wherein the address associated with the first data object remains unchanged for the lifetime of the first data object.

12. The method of claim 1, wherein the address associated with the first data object comprises a virtual memory address, and further comprising the step of translating the virtual memory address into a physical memory address.

13. The method of claim 1, wherein the application program transmits a make-resident command to the graphics driver to make the first data object resident in the buffer memory.

14. The method of claim 13, wherein the application program transmits a make-nonresident command to the graphics driver to indicate that the first data object need not remain resident in buffer memory.

15. A parallel processing subsystem, comprising:
   a processor that is configured to:
      receive a stream of one or more shading program commands via a graphics driver that executes within a central processing unit;
      execute at least one of the one or more shading program commands to generate processed data;
      determine from the stream of one or more shading program commands an address generated by the graphics driver and included in the at least one of the one or more shading program commands, wherein the address is associated with a first data object stored within the buffer memory; and
      store, from within the shader engine, the processed data in the first data object stored within the buffer memory,
      wherein the first data object becomes bound to a context of an application program by the graphics driver to provide the shader engine with access to the first data object, and the application program is associated with the stream of one or more shading program commands.

16. The parallel processing subsystem of claim 15, wherein the address associated with the first data object is specified as a high-level language pointer.

17. The parallel processing subsystem of claim 16 wherein the step of storing the processed data comprises dereferencing the high-level language pointer to access the first data object.

18. The parallel processing subsystem of claim 15, wherein the stream of one or more commands includes a first command for processing vertex attributes to generate the processed data.

19. The parallel processing subsystem of claim 15, wherein the stream of one or more commands includes a first command for processing vertex information stored in a second data object within the buffer memory to generate the processed data.

20. The parallel processing subsystem of claim 15, wherein the stream of one or more commands includes a first command for processing primitive information stored in a second data object within the buffer memory to generate the processed data.

21. The parallel processing subsystem of claim 15, wherein a first command comprises an atomic command that specifies an operation to be performed on data currently stored in the first data object to generate the processed data.

22. The parallel processing subsystem of claim 15, wherein the one or more shading program commands are specified as text-based assembly language commands.

23. A computer system, comprising:
- a central processing unit (CPU),
- a graphics processing unit (GPU), and
- a shader engine executing on the GPU and configured to:
    - receive a stream of one or more shading program commands via a graphics driver that executes within the CPU,
    - execute at least one of the one or more shading program commands to generate processed data,
    - determine from the stream of one or more shading program commands an address generated by the graphics driver and included in the at least one of the one or more shading program commands, wherein the address is associated with a first data object stored within a buffer memory, and
    - store the processed data in the first data object stored within the buffer memory,
    - wherein the first data object becomes bound to a context of an application program by the graphics driver to provide the shader engine with access to the first data object, and the application program is associated with the stream of one or more shading program commands.

* * * * *